United States Patent
Lee

(10) Patent No.: US 7,773,677 B2
(45) Date of Patent: Aug. 10, 2010

(54) IMAGE BLOCK ERROR CONCEALING APPARATUS AND METHOD USING WEIGHT FILTERING IN MOBILE COMMUNICATION SYSTEM

(75) Inventor: Sung-Kyu Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1376 days.

(21) Appl. No.: 11/028,683

(22) Filed: Jan. 5, 2005

(65) Prior Publication Data

US 2005/0190843 A1 Sep. 1, 2005

(30) Foreign Application Priority Data

Feb. 26, 2004 (KR) ...................... 10-2004-0013185

(51) Int. Cl.
H04N 7/12 (2006.01)
(52) U.S. Cl. ................................. 375/240.27
(58) Field of Classification Search ............. 375/240.27
See application file for complete search history.

(56) References Cited

U.S. PATENT DOCUMENTS

| | | | |
|---|---|---|---|
| 5,737,022 A * | 4/1998 | Yamaguchi et al. .... | 375/240.15 |
| 6,078,616 A | 6/2000 | Ozcelik et al. ............... | 375/240 |
| 6,134,352 A | 10/2000 | Radha et al. ................. | 382/254 |
| 6,625,326 B1 * | 9/2003 | Cho ............................. | 382/266 |
| 6,744,924 B1 * | 6/2004 | Hannuksela et al. ........ | 382/232 |
| 2004/0081363 A1 * | 4/2004 | Gindele et al. .............. | 382/260 |
| 2004/0181727 A1 * | 9/2004 | Ballard ........................ | 714/742 |
| 2006/0051068 A1 * | 3/2006 | Gomila ........................ | 386/114 |

FOREIGN PATENT DOCUMENTS

| | | |
|---|---|---|
| EP | 1492353 | 12/2004 |
| JP | 2000-041252 | 2/2000 |
| KR | 2001-0001208 | 1/2001 |
| KR | 2001-0112806 | 12/2001 |

OTHER PUBLICATIONS

"Video Error Concealment Using Decoder Motion Vector Estimation", Jian Zhang, et al., 1997 IEEE Tencon- Speech and Image Technologies for Computing and Telecommunications.
"Selective Block Matching for Error Concealment in Video System", Chun-Jen Huang, et al., 2002 IEEE SMC TAIH2.

(Continued)

*Primary Examiner*—Y. Lee
*Assistant Examiner*—Richard Torrente
(74) *Attorney, Agent, or Firm*—KED & Associates LLP

(57) ABSTRACT

Image block error concealing apparatus and methods in a mobile communication system can improve a picture quality. When a pixel/block has an error, a motion vector is generated by fast-motion-estimating a preceding frame and a subsequent frame, and the error-generated pixel/block can be restored using the motion-compensated pixel/block. Filtering can be performed by selecting first or second filters (e.g., an adaptive weight sum and an average sum) according to a difference value between the restored pixel/block and an average value of adjacent pixels/blocks, to refine the restored pixel/block.

21 Claims, 6 Drawing Sheets

OTHER PUBLICATIONS

"Real-Time Error Concealment in Digital Video Streams Using Digital Signal Processors", Eduardo Asbun, et al., Manuscript received Sep. 25, 2001.

"Recovery of Lost or Erroneously Received Motion Vectors", Wai-Man Lam, et al., 1993 IEEE.

"Error Control and Concealment for Video Communication: a Review", Yao Wang, et al., Proceeding of the IEEE, vol. 86, No. 5, May 1998.

"Motion Estimation for Video Coding Standards", Hsueh-Ming Hang, et al., XP-000724575, Nov. 1997.

European Search Report Dated Oct. 24, 2005.

* cited by examiner

IMAGE BLOCK ERROR CONCEALING APPARATUS AND METHOD USING WEIGHT FILTERING IN MOBILE COMMUNICATION SYSTEM

BACKGROUND OF THE INVENTION

1. Field of the Invention

The present invention relates to a mobile communication system providing a multimedia service.

2. Background of the Related Art

Mobile communication systems are rapidly increasing in demand worldwide as a new major communication media. Development of mobile communications accelerate personalization of communications and can accomplish a personal mobile communication society in which service portability can be provided to every user.

In addition, personalization of communication accelerates demands on multimedia wireless access mobile terminals that comprehensively handle data and image information and one not limited to voice communications. As transmission of multimedia contents, such as movies, music, animation, games or the like, is available through a mobile communication terminal, the mobile communication system provides a multimedia service.

FIG. 1 is a diagram that illustrates construction of an image decoding apparatus in a related art mobile communication system. As shown in FIG. 1, an image decoding apparatus in the mobile communication system includes a video CODEC decoder 10 for decoding an image frame, a display interface unit 20 for converting the decoded image frame into a display format and a display unit 30 for displaying the image frame outputted from the display interface unit 20.

The image decoding apparatus of the mobile communication system of FIG. 1 operates as follows. The video codec decoder 10 decodes an image frame, the display interface unit 20 converts the decoded image frame into a display format, and the display unit 30 displays the converted image frame. Accordingly, an image is displayed, for example, on the mobile communication terminal using an LCD or the like.

During the multimedia service, when a block error occurs in the image frame, a picture quality is degraded since even to a small block error can be visible to a user. Thus, service reliability deteriorates.

Therefore, methods and apparatus for correcting a block error of an image frame that can be adopted to the mobile communication system are needed that can reduce error correction calculation throughput, guarantee a real time processing or improve a picture quality. The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an image block error concealing apparatus and method in a mobile communication system that are capable of error processing operations.

Another object of the present invention is to provide an image block error concealing apparatus and method in a mobile communication system that are capable of error processing operations having reduced calculations to be available for a real time processing in concealing an error of an image frame.

Another object of the present invention is to provide an image block error concealing apparatus and method in a mobile communication system capable of correcting a block error of an image frame beyond an error concealment level using motion estimation and motion compensation.

Another object of the present invention is to provide an image block error concealing apparatus and method in a mobile communication system capable of correcting a block error of an image frame beyond an error concealment level by refining a connect block error by performing median filtering according to a corrected pixel and nearby pixel values.

Another object of the present invention is to provide an image block error concealing apparatus and method in a mobile communication system capable of correcting a block error of an image frame beyond an error concealment level by using motion estimation and motion compensation and performing an adaptive weight sum median filtering variably according to difference between error-corrected value and vertically neighboring values, to thereby form a natural image and improve a picture quality.

To achieve at least the above objects in whole or in part, there is provided an image block error concealing apparatus in a mobile communication system that includes an error concealing unit configured to search a previous frame and a subsequent frame with respect to an error-generated pixel/block using a motion estimation method and correct an error of the error-generated pixel/block and an error refining unit configured to refine the error-corrected pixel/block using an adaptive weight sum median filtering in a vertical direction when there is a prescribed difference between the error-corrected pixel/block and adjacent pixels/blocks.

To further achieve at least the objects and advantages in whole or in part, there is provided an image block error concealing method in a mobile terminal that includes generating a motion vector by motion-estimating a preceding frame and a subsequent frame for an error-generated pixel, restoring the error-generated pixel/block using the motion-compensated pixel and refining the restored pixel performing an adaptive weight sum median filtering according to a difference between the restored pixel and values of the nearby pixels.

To further achieve at least these advantages in whole or in parts, there is provided an image block error concealing method in a mobile communication system, wherein in correcting a block error of an image frame, when a difference between an error-corrected pixel and adjacent pixels is detectable, a median filtering is performed to refine the error-corrected pixel.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
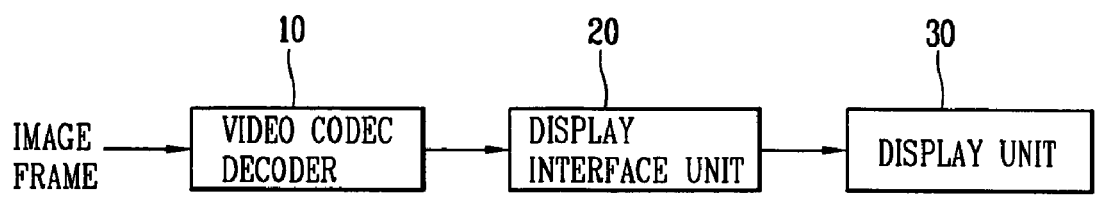
FIG. 1 is a diagram that illustrates an image decoding apparatus in a related art mobile communication system.
Figure 2:
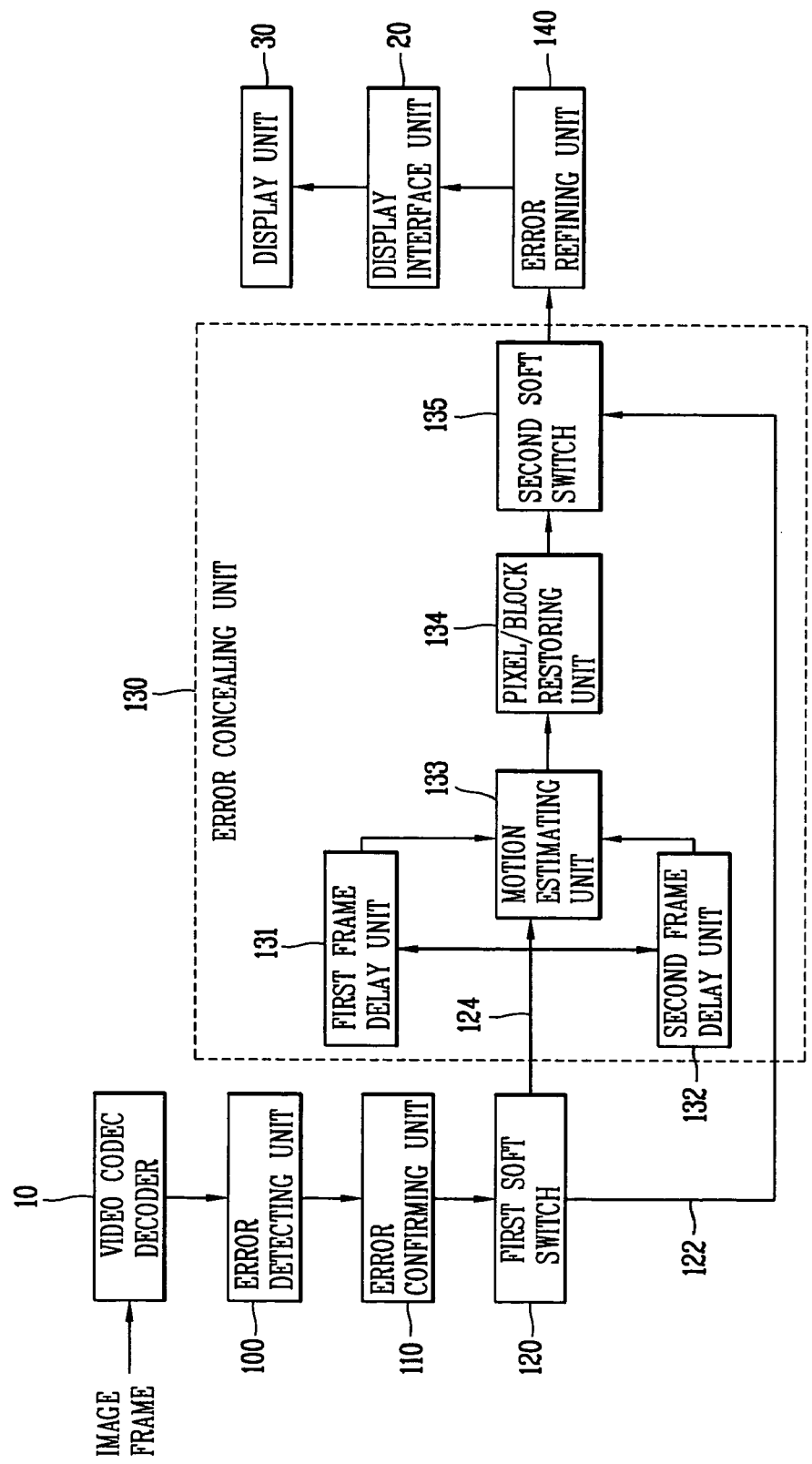
FIG. 2 is a diagram that illustrates an image block error concealing apparatus in a mobile communication system in accordance with a preferred embodiment of the present invention.

FIG. 2 illustrates construction of an image block error concealing apparatus in a mobile communication system in accordance with an embodiment of the present invention. As shown in FIG. 2, an embodiment of an image block error concealing apparatus in a mobile communication system can include a video codec decoder 10 for decoding an image frame; an error detecting unit 100 for detecting an error-generated pixel or block (e.g., pixel/block) from the decoded image frame; an error confirming unit 110 for re-checking (e.g., confirming) the error of the detected pixel/block; a first soft switch 120 for outputting pixels/blocks outputted from the error confirming unit 110 to one of an error correction path and a bypass path according to the confirmation information and an error concealing unit 130 for correcting (e.g., reducing below a visible level) the error of the pixel/block transmitted through an error correction path 124 and restoring a frame. The error correcting unit 130 can correct the error of the pixel/block by using a motion estimation and motion correction through sequential searching a preceding frame and a subsequent frame and can restore a frame with the pixel/block transmitted through the bypass path 122 and the error-corrected pixel/block. The image block error concealing apparatus can include a block error refining unit 140 for making a natural image by performing an adaptive weight sum median filtering variably according to a difference between the error-corrected pixel/block and nearby (e.g., vertically adjacent) pixels/blocks; a display interface unit 20 for converting an image frame outputted from the block error refining unit 140 into a display format and a display unit 30 for displaying the converted image frame.

The error concealing unit 130 can include a first frame delay unit 131 for storing a first (e.g., preceding) frame; a second frame delay unit 132 for storing a second (e.g., subsequent) frame; and a motion estimating unit 133 for sequentially performing a motion estimation on the combination of the first frame delay unit 131 and the second frame delay unit 132 to generate a motion vector of a pixel/block to be used for an error correction. A pixel/block restoring unit 134 can restore the error-generated pixel/block using the pixel/block that has been motion-compensated through the motion vector. A second soft switch 135 can restore a frame by using the pixel/block restored in the pixel/block restoring unit 134 and the pixel/block transmitted through the bypass path 122.

Figure 3:
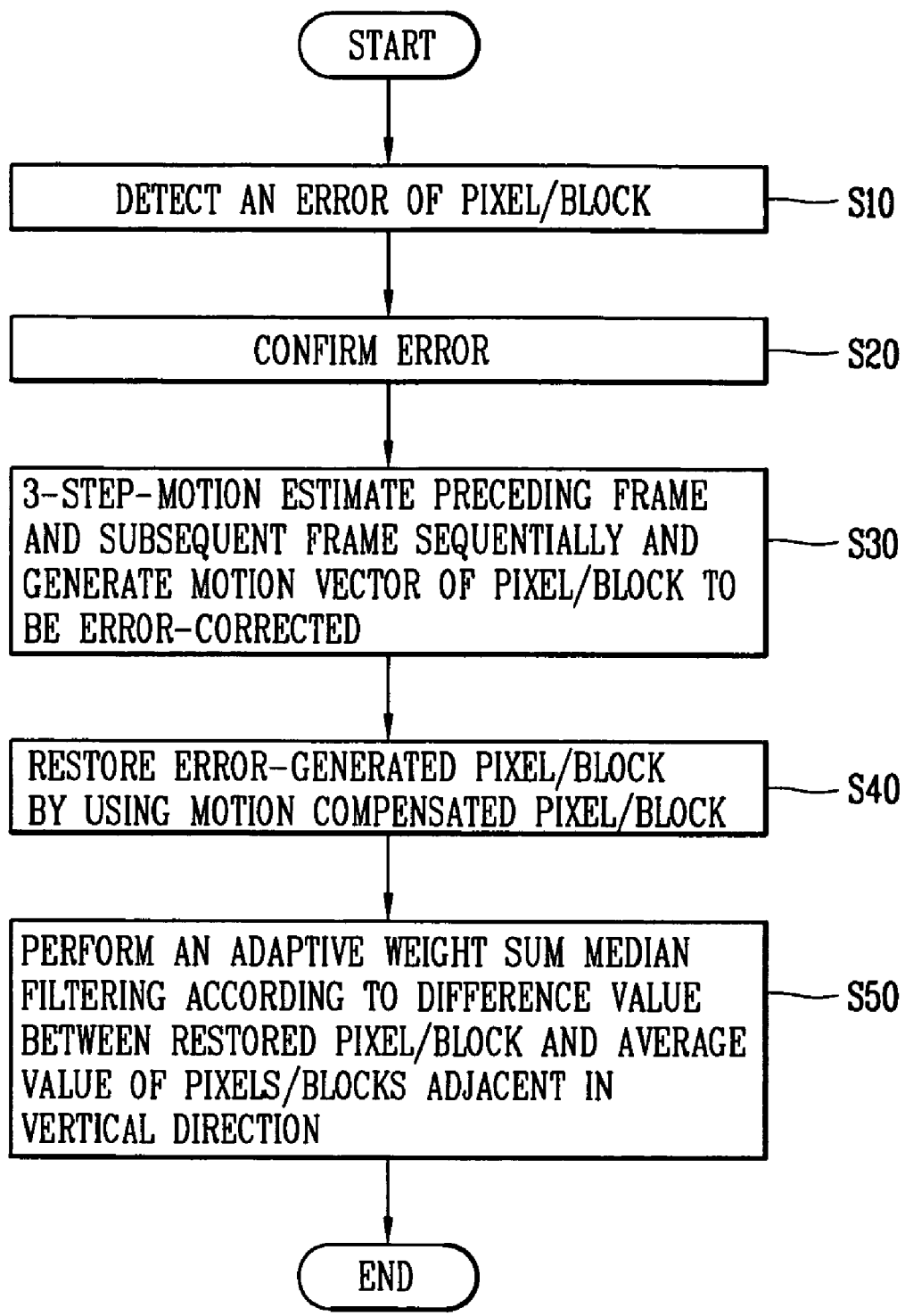
FIG. 3 is a diagram that illustrates an image block error concealing method in a mobile communication system in accordance with a preferred embodiment of the present invention.

FIG. 3 is a diagram that illustrates an embodiment of an image block error concealing method in a mobile communication system in accordance with the present invention. The embodiment of an image block error concealing method of FIG. 3 can be applied to and will be described using the embodiment of an image block error concealing apparatus of FIG. 2. However, the present invention is not intended to be so limited.

As shown in FIG. 3, after a process starts an image block error concealing method in a mobile communication system can include detecting an error-generated pixel/block from a decoded image frame (block S10); confirming the error of the detected pixel/block (block S20) and generating a motion vector (block S30). The error-generated pixel/block is preferably a pixel/block from a decoded image frame that includes an error or is erroneous. The motion vector can be generated by motion-estimating at least one of a preceding frame or a subsequent frame in case of the error-generated pixel/block (block S30). The embodiment of the image block error concealing method can include restoring the error-generated pixel/block by using the motion-compensated pixel/block (block S40), and performing an adaptive weight sum median filtering according to a difference between the restored pixel/block and the nearby (e.g., vertically adjacent) pixel/block (block S50).

For example, a block error concealing method of an image frame of a mobile communication terminal will now be described. The error detecting unit 100 of the mobile communication terminal detects an error-generated pixel or block from a decoded image frame from the video codec decoder 10.

As an example, a case where the error-generated pixel is restored will be described. For instance, the error-generated pixel may have a value of 255 and displayed in block black color.

The error detecting unit 100 can detect a pixel having the value of 255 (block S10). The error confirming unit 110 can check (determine) whether the detected pixel is a pixel that actually has an error (block S20).

Figure 4:
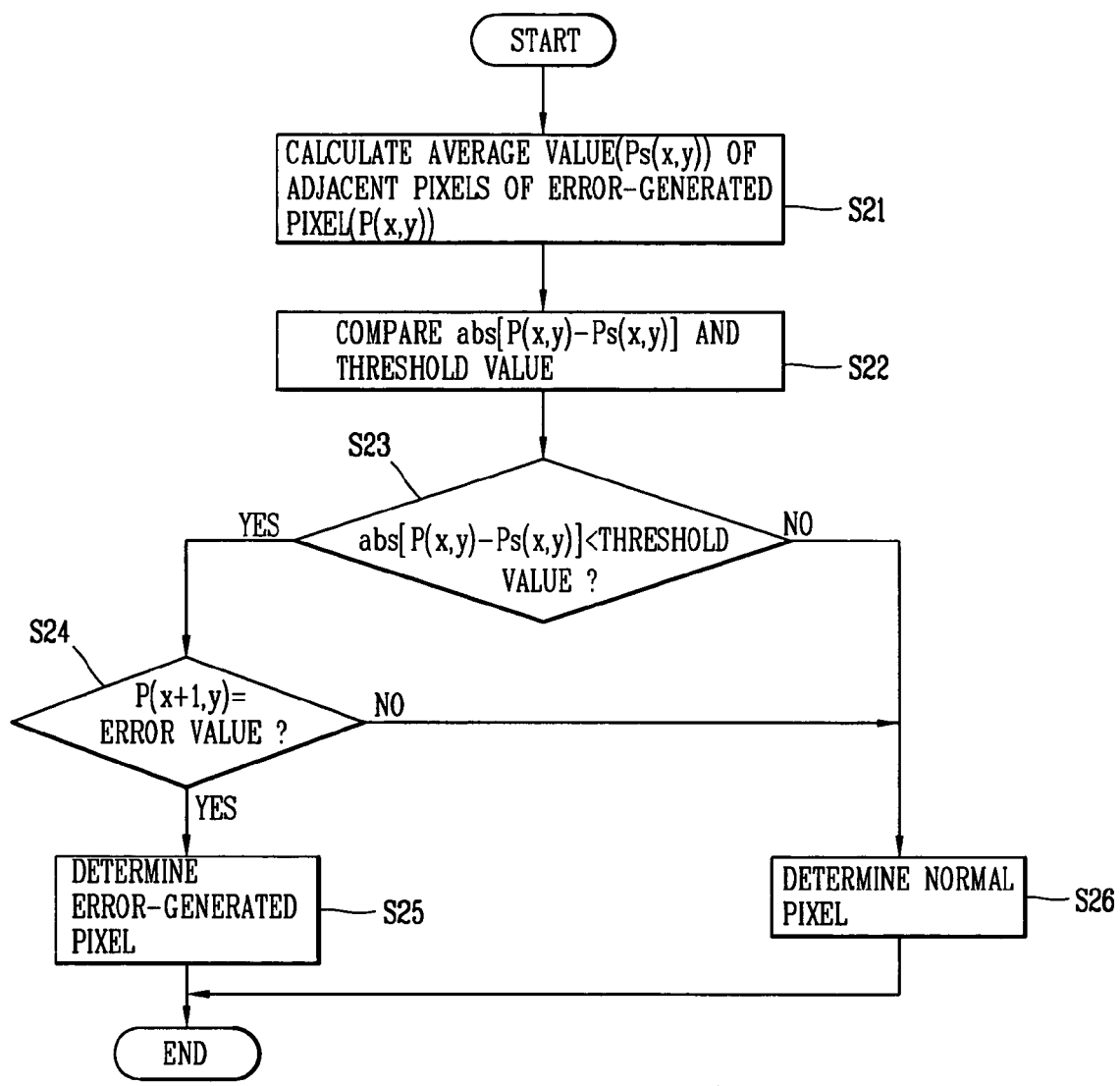
FIG. 4 is a diagram that illustrates a method for confirming an error of a pixel detected with the error.

FIG. 4 is a diagram that illustrates an exemplary method for confirming an error of a pixel detected with an error. As shown in FIG. 4, the error confirming unit 110 can calculate an average value ($Ps(x,y)$) among adjacent pixels of the detected pixel ($P(x,y)$) (block S21) using the following equation.

$$Ps(x, y) = \{P(x-1, y-1) + P(x, y-1) + P(x+1, y-1)\}/3 + \{P(x-1, y) + P(x+1, y)\}/2 + \{P(x-1, y+1) + P(x, y+1) + P(x+1, y+1)\}/3 \quad (1)$$

Then, the error confirming unit 110 can calculate an absolute value (abs $[P(x,y)-Ps(x,y)]$) of a difference value between the detected pixel ($P(x,y)$) and the average value ($Ps(x,y)$), and compare a threshold value for determining a normal pixel and the absolute value (abs$[P(x,y)-Ps(x,y)]$) (block S22).

If the absolute value (abs$[P(x,y)-Ps(x,y)]$) is smaller than the threshold value (block S23), the error confirming unit 110 can check a value of the right pixel ($P(x+1,y)$) of the detected pixel ($P(x,y)$) (block S24). If the value of the right pixel ($P(x+1,y)$) has an error value, the error confirming unit 110 preferably determines that the detected pixel ($P(x,y)$) has an error (block S25).

If, however, the absolute value (abs$[P(x,y)-Ps(x,y)]$) is not smaller than the threshold value in the block S23 or if the value of the right pixel (P(x+1,y)) is not an error value, the error confirming unit 110 preferably determines that the detected pixel (P(x,y)) is a normal pixel (block S26).

The first soft switch 120 can transmit the error-generated pixel to the motion estimating unit 133 according to the confirmation information of the error confirming unit 110, and can bypass the normal pixel. In embodiments according to the present invention, because the normal pixel is bypassed without passing through the error correction path, an error correction throughput can be improved.

The motion estimating unit 133 of the error concealing unit 130 can search the first frame delay unit 131 storing a preceding frame of a current frame by using a 3-step motion estimation. Using a full searching would not only increase calculation processing or a calculation throughput, but also make it difficult to process on a real time basis, so the motion estimation 133 preferably uses the 3-step or 5-step motion estimation.

Figure 5:
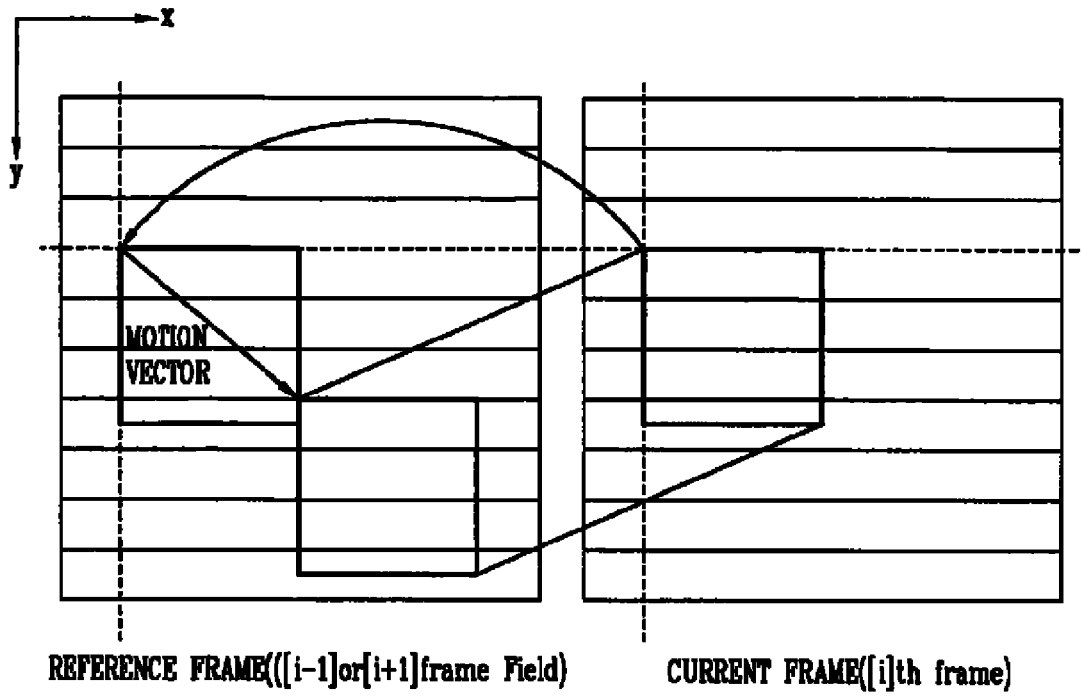
FIG. 5 is a diagram that illustrates a motion estimating method.

FIG. 5 is a diagram that illustrates an exemplary motion estimating method (e.g., 3-step). As shown in FIG. 5, when the same block as a block to be error-corrected of the current frame is searched from the preceding frame, the motion estimating unit 133 can generate a motion vector of the searched block (or pixel). If, however, the same block is not searched from the preceding frame, the motion estimating unit 133 can start searching of the second frame delay unit 132 storing a subsequent frame of the current frame and can search the same block as the error-corrected block from the subsequent frame. In this manner, rather than simultaneously searching the first and second frame delay units 131 and 132, the first frame delay unit 131 is first searched by using the 3-step or 5-step motion estimation, and if it fails to find a pixel of a desired block, the second frame delay unit 132 is searched. Thus, the calculation throughput and required time for error correction can be reduced and a real time processing can be guaranteed (block S30).

When the motion vector is generated by the motion estimating unit 133, the pixel/block restoring unit 134 can obtain a pixel value of the motion-compensated block by using the motion vector. The pixel/block restoring unit 134 can restore the error pixel by using the obtained pixel value (block S40).

The second soft switch 135 preferably restores a frame by using the restored pixel and a normal pixel transmitted through the bypass path 122. The error refining unit 140 can adaptive weight sum median filter the restored pixel among frames outputted from the second soft switch 135 to generate a natural image frame (block S50).

Figure 6:
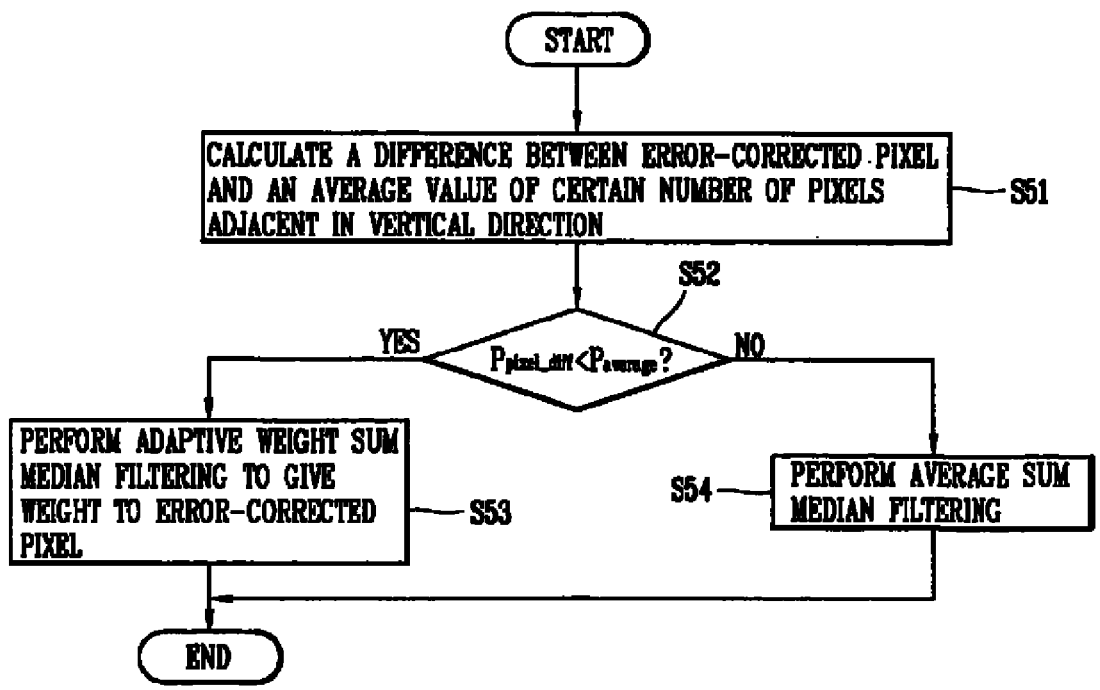
FIG. 6 is a diagram that illustrates a method for refining an error-corrected pixel by using an adaptive weight sum median filtering.

FIG. 6 is a diagram that illustrates an exemplary method for refining an error-corrected pixel by using an adaptive weight sum median filtering. The method shown in FIG. 6 can be applied to and described using the error refining unit 140. However, the present invention is not intended to be so limited.

The error refining unit 140 can calculate an average value (Pav(i,j)) of a prescribed or certain number of pixels adjacent (e.g., vertically) to the pixel (Pcandidate(i,j)), which has been error-corrected in the error concealing unit 130 by equation (2) shown below:

$$Pav(i,j) = \{SUM(Pi,j+k)(\text{from } k=-n \text{ to } n, \text{ except } 0)\}1/2n \quad (2)$$

For example, if the adaptive weight sum median filter is 9 taps, 'n' becomes 4. The average value (Pav(i,j)) is an average value of 2 n number of pixels except for the error-corrected pixel (Pcandidate(i,j)).

Then, the error refining unit 140 can calculate a difference between the error-corrected pixel (Pcandidate(i,j)) and the average value (Pav(i,j)) by equation (3) shown below (block S51).

$$Ppixel\_diff = Pcandidate(i,j) - Pav(i,j) \quad (3)$$

The error refining unit 140 can compare the difference (Ppixel_diff) and the average value (Pav(i,j)) (block S52). If the difference (Ppixel_diff) is smaller than the average value (Pav(i,j)), the error refining unit 140 preferably increases the value of the error-corrected pixel (Pcandidate(i,j)) through the adaptive weight sum median filtering by equation (4) shown below:

$$\begin{aligned} Ppixel\_refine = & [\{2\wedge(n-1) * P(i,j) + \\ & \{[2\wedge(n-2) * P(i,j-1)] + [2\wedge(n-2) * P(i,j+1)]\} + \\ & \{[2\wedge(n-3) * P(i,j-2)] + [2\wedge(n-3) * P(i,j+2)]\} + \\ & \{[2\wedge(n-4) * P(i,j-3)] + [2\wedge(n-4) * P(i,j+3)]\} + \\ & \ldots (\text{until } n-k=-1)] * 1/(2n+1) \end{aligned} \quad (4)$$

Figure 7A:
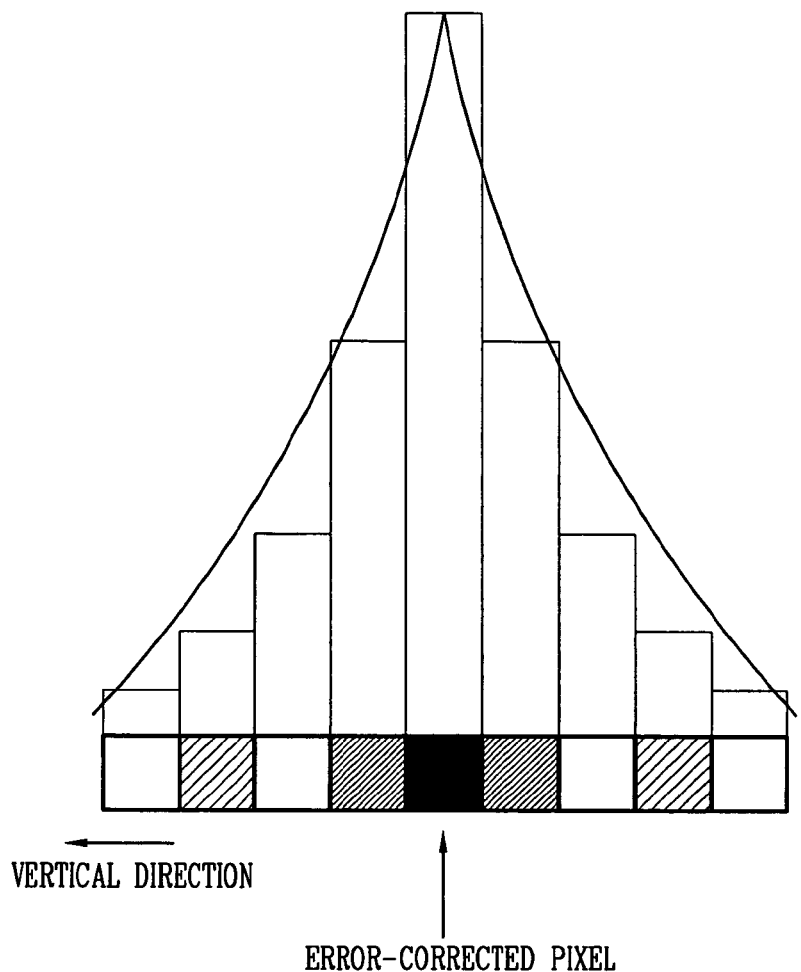
FIG. 7A is a diagram that illustrates a median filtering using a weight sum.

As shown in FIG. 7A, the error refining unit 140 can allocate a weight equivalent to degree of adjacency in a vertical direction to the error-corrected pixel (Pcandidate(i,j)) to each adjacent pixel. And then, the error refining unit 140 performs the adaptive weight sum median filtering in such a manner that it multiplies the large st weight to the error-corrected pixel (Pcandidate(i,j)) and the next largest weight to the two pixels (P(i,j−1),P(i,j+1)) that are very adjacent in a vertical direction.

FIG. 7A illustrates an example of an adaptive weight sum 9-tap median filter, and in this case, 'n' of equation (4) becomes 4. The error refining unit 140 can refine the error-corrected pixel (Pcandidate(i,j)) by using the value of the pixel (Ppixel_refine) generated through the adaptive weight sum median filtering (e.g., block S53).

If, however, the difference (Ppixel_diff) is not smaller than the average value (Pav(i,j)) (block S52), the error refining unit 140 can refine the error-corrected pixel (Pcandidate(i,j)) through an average sum median filtering by equation (5) shown below:

$$Ppixel\_refine = \{SUM(P(i,j+k)(\text{from } k=-n \text{ to } n))\} * 1/(2n+1) \quad (5)$$

Figure 7B:
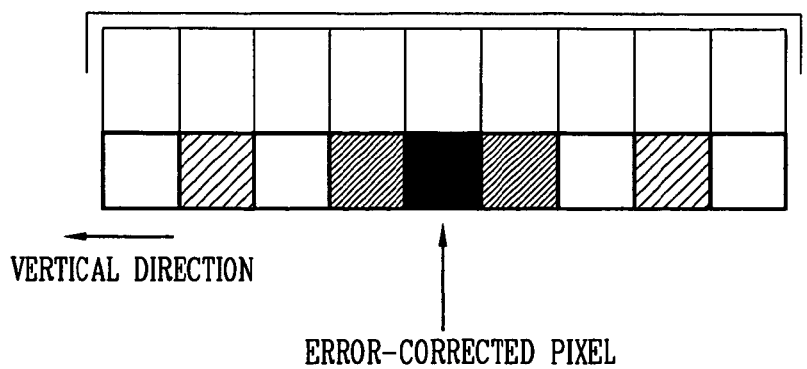
FIG. 7B is a diagram that illustrates a median filtering using an average sum.

As shown in FIG. 7B, the error refining unit 140 can perform an average sum median filtering by multiplying the same weight to the error-corrected pixel (Pcandidate(i,j)) and the pixels adjacent to each other in the vertical direction. The error refining unit 140 can refine the error-corrected pixel (Pcandidate(i,j)) by using the pixel (Ppixel_refine) generated through the average sum median filtering (block S54).

Accordingly, in embodiments of the present invention, if there is a difference that may effect sensitively the eyes of a human for a detected pixel (e.g., between the pixels) or block, which has been error-corrected through the motion estimation and motion compensation, and the pixels adjacent in the vertical direction, the adaptive weight sum median filtering can be performed in the vertical direction of the error-corrected pixel, whereby the error-corrected pixel is refined to restore a natural image close to an original image.

As described above, embodiments of image block error concealing apparatus and methods in a mobile communication system of the present invention have various advantages. For example, when an error of a pixel/block is corrected by using the motion estimation and motion compensation, both preceding frame and subsequent frame are not necessarily searched, and the preceding frame can be searched first. If a desired pixel/block is not found from the preceding frame, then the subsequent frame is searched. Further, searching is made by the 3-step or 5-step motion estimating method, not a full searching method, so that a calculation throughput can be reduced and a real time processing can be performed. In addition, by using the motion estimation and motion compensation, the error of the pixel/block is not simply concealed but can also be corrected. For example, an error-corrected pixel/block can be refined by variably performing the adaptive weight sum median filtering according to a difference between a value of the error-corrected pixel/block and values of neighboring pixels/blocks (e.g., adjacent in a vertical direction). Thus, a natural image close to an original image can be restored.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An image block error concealing apparatus in a mobile communication system comprising:
   an error concealer configured to search at least one of a previous frame or a subsequent frame with respect to a pixel/block using a motion estimation method, and to correct an error of the pixel/block based on the search; and
   an error refiner configured to refine the error-corrected pixel/block using adaptive weight sum median filtering in a predetermined direction when there is a prescribed difference between the error-corrected pixel/block and adjacent pixels/blocks,
   wherein the error concealer searches for a same pixel/block in the previous frame as a pixel/block to be error-corrected of a current frame, and only if the pixel/block is not found by the search the error concealer searches for the same pixel/block in the subsequent frame as the error-corrected pixel/block,
   wherein the error refiner is configured to:
   calculate a difference between the error-corrected pixel/block and an average value of one or more adjacent pixel/blocks,
   compare the difference and the average value,
   if the difference is smaller than the average value, perform adaptive weight sum median filtering by multiplying different weights to the error-corrected pixel/block and one or more of the adjacent pixel/blocks, and
   if the difference is not smaller than the average value, perform average sum median filtering by multiplying a same weight to the error-corrected pixel/block and the one or more adjacent pixel/blocks.

2. The apparatus of claim 1, wherein the prescribed difference is a difference visibly detectable by a user.

3. The apparatus of claim 1, wherein the error concealer comprises:
   a first frame delay storage configured to store the previous frame;
   a second frame delay storage configured to store the subsequent frame;
   a motion estimator configured to perform motion estimation based on at least one of the previous frame or the subsequent frame and to generate a motion vector to be used for an error correction, wherein the motion estimator performs motion estimation sequentially based on the previous frame and the subsequent frame if a pixel/block to be corrected is not located by the first search;
   a pixel/block restorer configured to restore the error-generated pixel/block by using the pixel/block that has been motion-compensated through the motion vector; and
   a first switch configured to restore a frame using the pixel/block restored by the pixel/block restorer and a pixel/block transmitted through a bypass path that bypasses the motion estimator.

4. The apparatus of claim 3, wherein the motion estimator searches the first frame delay storage by using high speed motion estimation, and wherein when the motion estimator fails to locate a pixel/block to be corrected from the first frame delay unit, the motion estimator searches the second frame delay storage using the high speed motion estimation.

5. The apparatus of claim 4, wherein the high speed motion estimating method is one of a 3-step motion estimating method or a 5-step motion estimating method.

6. The apparatus of claim 1, further comprising:
   an error detector configured to detect the error-generated pixel/block from a decoded image frame;
   an error confirmer configured to confirm the error of the detected error-generated pixel/block; and
   a second switch configured to receive a pixel/block outputted along a signal path that bypasses a motion estimator without error correction.

7. The apparatus of claim 1, wherein the prescribed difference is determined by comparing a difference value between the error-corrected pixel/block and a first average value of adjacent pixels/blocks exclusive of the error-corrected pixel/block and a second average value of the adjacent pixels/blocks including the error-corrected pixel/block.

8. The apparatus of claim 1, wherein the adaptive weight sum median filtering is performed in the following manner:

$$[\{2^{\wedge}(n-1) * P(i,j) + \{[2^{\wedge}(n-2) * P(i,j-1)] + [2^{\wedge}(n-2) * P(i,j+1)]\} +$$
$$\{[2^{\wedge}(n-3) * P(i,j-2)] + [2^{\wedge}(n-3) * P(i,j+2)]\} +$$
$$\{[2^{\wedge}(n-4) * P(i,j-3)] + [2^{\wedge}(n-4) * P(i,j+3)]\} +$$
$$\ldots (\text{until } n-k = -1)] * 1/(2n+1)$$

wherein P(i,j) indicates a pixel that has been error-corrected by the error concealing unit.

9. The apparatus of claim 1, wherein the average sum median filtering is performed as follows:

$$\{SUM(P(i,j+k)(\text{from } k=n \text{ to } n))*1/(2n+1)$$

wherein P(i,j) indicates a pixel that has been error-corrected by the error concealer.

10. The apparatus of claim 1, wherein the error concealer and the error refiner are in a mobile terminal.

11. The apparatus of claim 1, further comprising:
   a first switch to route the pixel/block along a first signal path that bypasses a motion estimator of the error concealer when no error is detected in the pixel/block, and to route the pixel/block along a second signal path that includes the motion estimator when an error is detected in the pixel/block.

12. The apparatus of claim 11, further comprising:
an error confirmer to confirm that the pixel/block includes an error,
wherein the error confirmer checks whether a gray scale value of the pixel/block lies in a predetermined range indicative of a possible error, and determines that the pixel/block does not include an error even though the gray scale value of the pixel/block lies in the predetermined range.

13. The apparatus of claim 1, wherein the one or more adjacent pixel/blocks are adjacent to the error-corrected pixel/block in a vertical direction.

14. The apparatus of claim 13, wherein if the difference is smaller than the average value, an effect produced by said filtering is not visually perceptible by a user.

15. The apparatus of claim 14, wherein if the difference is not smaller than the average value, an effect produced by said filtering is visually perceptible by a user.

16. An image block error concealing method in a mobile communication system, wherein in correcting a block error of an image frame, when a difference between an error-corrected pixel and adjacent pixels is detectable, a median filtering is performed to refine the error-corrected pixel, said median filtering including:
calculating an average value of the adjacent pixels;
calculating a difference between a value of the error-corrected pixel and the average value of the adjacent pixels;
comparing the difference to the average value of the adjacent pixels;
if the difference is smaller than the average value, perform adaptive weight sum median filtering by multiplying different weights to the error-corrected pixel and one or more of the adjacent pixels, and
if the difference is not smaller than the average value, perform average sum median filtering by multiplying a same weight to the error-corrected pixel and one or more adjacent pixels.

17. The method of claim 16, wherein said multiplying changes a value of the error-corrected pixel by:
allocating a largest weight to the error-corrected pixel and a weight equivalent to a degree of adjacency to the adjacent pixels/blocks to perform the median filtering when the difference is smaller than an average value of the error-corrected pixel and one or more of the adjacent pixels.

18. The method of claim 17, wherein the pixel comprises a block of an image.

19. The method of claim 16, wherein the adjacent pixels are in a vertical direction relative to the error-corrected pixel.

20. The method of claim 19, wherein if the difference is smaller than the average value, an effect produced by said filtering is not visually perceptible by a user.

21. The method of claim 20, wherein if the difference is not smaller than the average value, an effect produced by said filtering is visually perceptible by a user.

* * * * *